United States Patent [19]

Mathes et al.

[11] Patent Number: 5,434,225
[45] Date of Patent: Jul. 18, 1995

[54] AMINE-UNSATURATED EPOXIDIZED POLYSULFIDE ADDITION PRODUCTS

[75] Inventors: Alfred Mathes, Rheinberg; Ulrich Grundke, Duisburg; Bert Meier, Menden; Jurgen Zehrfeld, Voerde, all of Germany

[73] Assignee: Rutgerswerke AG, Germany

[21] Appl. No.: 349,900

[22] Filed: Dec. 6, 1994

Related U.S. Application Data

[63] Continuation-in-part of Ser. No. 32,790, Mar. 17, 1993, abandoned.

[30] Foreign Application Priority Data

Mar. 25, 1992 [DE] Germany .................. 42 09 554.9

[51] Int. Cl.$^6$ .................. C08L 63/02; C08G 59/16
[52] U.S. Cl. .................. 525/525; 525/531; 525/922
[58] Field of Search .................. 525/531, 922, 525

[56] References Cited

U.S. PATENT DOCUMENTS

| | | | |
|---|---|---|---|
| 3,925,349 | 12/1975 | Gaske .................. | 525/922 |
| 4,431,782 | 2/1984 | Harris et al. .................. | 525/531 |
| 4,447,580 | 5/1984 | Ai et al. .................. | 525/922 |
| 4,595,734 | 6/1986 | O'Hearn .................. | 525/922 |
| 4,689,389 | 8/1987 | Lee et al. .................. | 528/374 |
| 5,173,549 | 12/1992 | Booth et al. .................. | 525/537 |

*Primary Examiner*—Robert E. Sellers
*Attorney, Agent, or Firm*—Bierman and Muserlian

[57] ABSTRACT

An epoxy resin adhesive, sealing or coating composition containing as a curing agent an addition product of A) at least one member of the group consisting of primary amines and secondary amines and B) at least one ester having a formula selected from the group consisting of

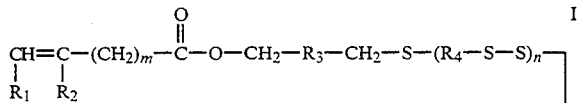

and

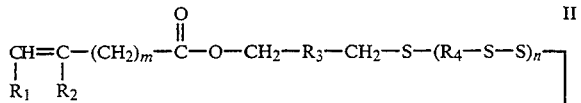

wherein m is 0 or 1, n is an integer from 3 to 25, 0 is an integer from 1 to 20, p is an integer from 1 to 10, $R_1$ is selected from the group consisting of furyl, phenyl and hydrogen, $R_2$ is hydrogen or methyl $R_3$ is

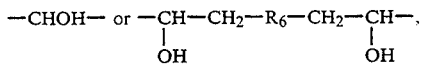

$R_4$ is $-C_2H_4-O-CH_2-O-C_2H_4-$, $R_5$ is methylene or $-CH_2-CH-CH_2-R_6-CH_2-$.
$R_6$ is selected from the group consisting of

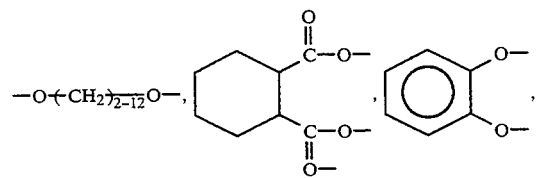

(Abstract continued on next page.)

-continued
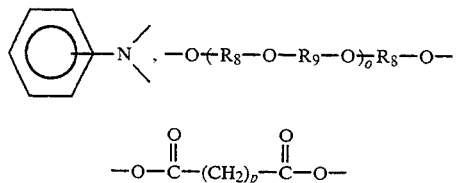
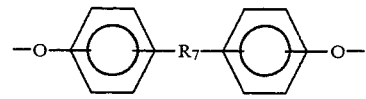
and
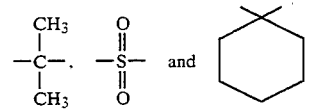
$R_7$ is selected from the group consisting of methylene,
-continued
—C(CH₃)₂—, —S(=O)₂—, and cyclohexylidene
and $R_8$ and $R_9$ are individually ethylene or propylene.
3 Claims, No Drawings

AMINE-UNSATURATED EPOXIDIZED POLYSULFIDE ADDITION PRODUCTS

PRIOR APPLICATION

This application is a continuation-in-part of U.S. patent application Ser. No. 032,790 filed Mar. 17, 1993, now abandoned.

STATE OF THE ART

Epoxy resin binding means are distinguished inter alia by their high mechanical strength. Due to the aromatic structure of the basic building blocks and the high cross-linkage density, the elongation at rupture of the binding means is, as a rule, below 5%. Particularly, for sealings and coatings, however, an increased requirement of epoxy resin bonding means with a higher flexibility and elasticity and good resistance against chemicals exists.

Several methods are know for modifying the high mechanical and chemical stabilities of epoxy reins by mixing with reactive flexibilized substances in such a way as to obtain flexibilized and simultaneously stable binding means. However, the binding means exhibit during processing, during curing or in terms of chemical stability disadvantages which limit their use in practice. The possibility exists of achieving good flexibilizing or epoxy resins through common curing of liquid terminal mercapto polysulfide oligomers or polymers with epoxy resins which permit sufficient crack-bridging in a coating. Unfortunately, such coatings are not sufficiently stable in the presence of aromatic hydrocarbons, esters of ketones or chlorinated hydrocarbons.

The same limitations of stability apply also to directly epoxidized polysulfide polymers. One disadvantage in this connection are the low reactivity and the partial incompatibility with polar cold curing agents which are resistant to chemicals for epoxy resins. An increased phase separation of the reactive polysulfide polymers occurs which due to the microsegregation are not incorporated into the network. As a consequence, the elongation at tear and tensile strength decrease and the resistance to tear propagation decreases and the swellability with aromatic hydrocarbons/chlorinated hydrocarbons, esters and ketones increases.

The second possibility for flexibilizing epoxy resins resides in curing with high-molecular amine compounds, for example with polyaminoamides or with modified amine compounds such as those known from DE-A-3, 919, 128 or DE-A-3, 919, 547. But curing agents of this type yield, if they have a sufficient low processing viscosity at all, insufficient resistance against chemicals.

Therefore, the approved coatings with reactive synthetic materials for collecting troughs according to Wasserhaushaltsgesetz (water resource law), Paragraph 19, have for example a multilayered structure. A flexible coating ensures this bridging and a second coating is stable against the stored chemicals. The flexible undercoating usually has an insufficient chemical stability while the top coating has insufficient crack-bridging properties. Thereby, the multilayered structure becomes unavoidable. Several disadvantages result: the coating is expensive to apply and the material costs of the coating are high. The coating fulfills its sealing function only when the chemically stable cover coating is intact. Because of the flexible undercoating, only a low mechanical load can be placed on the structure of the coating.

OBJECTS OF THE INVENTION

It is an object of the invention to provide novel epoxy resin compositions containing an addition product as the curing agent and a process for their preparation.

It is another object of the invention to provide improved epoxy resin compositions with a high resistance to chemicals and with a high elongation.

These and other objects and advantages of the invention will become obvious from the following detailed description.

THE INVENTION

The novel epoxy resin composition containing as a curing agent an addition product of the invention have the addition product derived from the reaction of A) at least one member of the group consisting of primary amines and secondary amines and B) at least one ester having a formula selected from the group consisting of

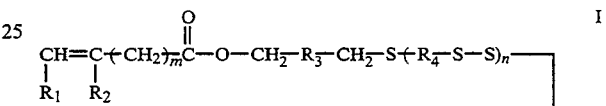

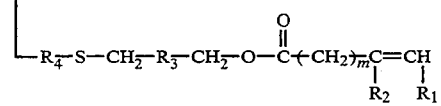

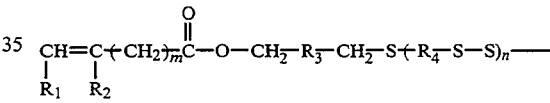

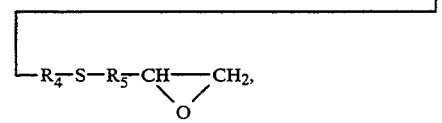

wherein m is 0 or 1, n is an integer from 3 to 25, O is an integer from 1 to 20, p is an integer from 1 to 10, $R_1$ is selected from the group consisting of furyl, phenyl and hydrogen, $R_2$ is hydrogen or methyl, $R_3$ is

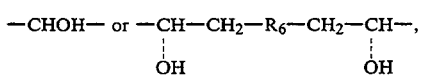

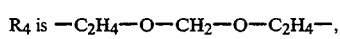

$R_5$ is methylene or

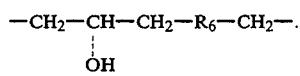

$R_6$ is selected from the group consisting of

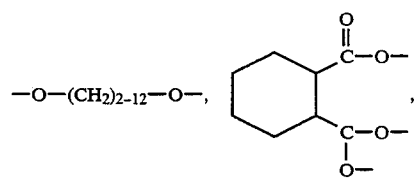

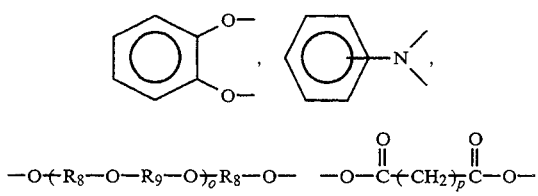

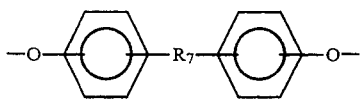

and

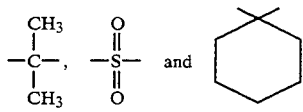

$R_7$ is selected from the group consisting of methylene,

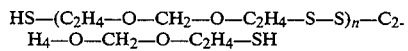

$R_8$ and $R_9$ are individually ethylene or propylene.

The addition products are useful as flexible curing agents for the epoxy compounds and the compositions are useful for the production of coatings, of adhesives and sealants, of coating compounds and laminates based on epoxy containing compositions.

These epoxy resin compositions containing the ester-amine addition reaction products can be used wherein a usable curing rate is already given at room temperature. The epoxy compounds cured with these esters amine addition products are flexible materials which permit an extensibility of up to 150% and which subsequently show nearly complete resettability. Moreover, these cured products have an excellent resistance to chemicals. Due to the flexibility and chemical stability of the cured epoxy compounds, the curing agents are especially suitable for the production of coatings as well as adhesive and sealing substances based on epoxy compounds.

Since the curing agents of the invention permit cold as well as also heat curing, the suitability for the production of casting compounds and of high-quality laminates on the basis of epoxy. compounds is given.

The ester-amine addition products of the invention are produced in simple manner by reacting amine compounds which contain at least two amine hydrogen atoms in the presence of air with unsaturated esters of epoxidized polysulfides of formula I and/or II for several hours (2 to 10 hours) at temperatures of 80° to 90° C. For the formation of the addition products, one amine hydrogen atom is required for each ethylenically unsaturated bond of the ester. All further amine hydrogen atoms of the addition product which can be set through intentional selection of the amine component serve in the use of the invention for curing the epoxy compounds.

Examples of amine components which can be used are all aliphatic, alicyclic and aromatic amines or polyamines, used singly or in any mixture with one another which have at least one primary or at least two secondary amino groups. All amines and polyamines thereof are suitable which are known as curing agents for epoxy compounds and the quantity of amines is selected so that for each ethylenically unsaturated group of the ester, one amino molecule is used.

The esters used in the invention for the formation of the addition product are conversion products of epoxidized polysulfides with ethylenically unsaturated acids. Starting building blocks are commercially available liquid polysulfide oligomers or polymers of the formula $$HS-(C_2H_4-O-CH_2-O-C_2H_4-S-S)_n-C_2H_4-O-CH_2-O-C_2H_4-SH$$

wherein n is an integer of 3 to 25. The products used are not uniform with respect to their molecular size but rather the size n must be viewed as a statistical mean. The commercially available products are 0.1 to 2% trifunctional and the trifunctionality is retained even in the further conversion, but is not noticeable in the final product. It is not taken into consideration in the stated general formula.

Polysulfide oligomers or polymers are converted in a manner known per se by stirring together the reactants which are either liquid or in solution and heating for several hours at temperatures of 40° to 80° C. with epoxy group-containing, difunctional compounds. Appropriate compounds are either epihalohydrin, preferably epichlorohydrin or difunctional epoxy compounds. As such, in principle, all difunctional epoxy compounds can be used. Preferred epoxy compounds are aliphatic or aromatic glycidyl ethers or esters such as resorcine diglycidylether, diglycidyl aniline, diglycidyl ether or bisphenols, particularly of bisphenol A or F, aliphatic diols of 2 to 12 carbon atoms, polyalkylene glycol diglycidylether or aliphatic dicarboxylic acids of 3 to 13 carbon atoms.

In the conversion of the polysulfide oligomers or polymers with epihalohydrin, the quantity of epihalohydrin equivalent to the mercapto groups is used. Corresponding products are commercially available under the trade name ELP ® (Morton). In the conversion of the polysulfide oligomers or polymers with difunctional epoxy compounds, the quantitative ratios are selected so that for each mercapto group at least two epoxy groups are used.

Under large-scale operational conditions, frequently an excess of epoxy compounds is selected since this ensures the complete conversion of the mercapto groups in a relatively short reaction time. The excess of the epoxy groups can be up to ten-fold of the stoichiometric ratio corresponding to the mercapto groups. Subsequently, after the conversion, a mixture of epoxy compounds and epoxidized polysulfide oligomers and polymers results which without further processing is supplied to the further reaction, namely the esterification with an ethylene unsaturated carboxylic acid. The quantity of unsaturated carboxylic acid which is equivalent to all epoxy groups is used so that as a reaction product a mixture of esters known per se of epoxy compounds and the esters of the invention is obtained. Such mixtures form also addition products with amines which as flexible curing agents solve the objects of the invention.

The epoxidized polysulfides obtained in the first reaction step are converted without further processing with an ethylene unsaturated carboxylic acid. This conversion also takes place in a manner known per se by stirring together the reactants which are either liquid or in solution and heating the reaction mixture to a temperature of 60° to 90° C. for several hours. Generally, the reaction is stopped when an acid number of less than 5 has been reached. The epoxidized polysulfides, depending on the desired product, are converted with a quantity or one half of the quantity corresponding to the epoxy equivalent of ethylene unsaturated acid. Examples of corresponding ethylene unsaturated acids are acrylic acid, methacrylic acid, furylacrylic acid, crotonic acid and cinnamic acid.

The ethylenically unsaturated esters of epoxidized polysulfides react already at room temperature with amine hydrogens with the formation of addition products. Since this reaction is faster than the reaction of amine hydrogen atoms with epoxy compounds, the flexible curing agents of the invention can also be produced in a mixture of esters of epoxidized polysulfides, epoxy compounds and amines in situ and they continue to react immediately in a subsequent reaction with epoxy compounds with the curing of the mixture, suitable epoxy compounds are all epoxy resins which most often contain at least two epoxy groups per molecule as well as monomeric epoxy compounds such as are used customarily as so-called reactive thinners.

A special epoxy compound in the curing of which according to the invention by mixing with the flexible curing agents of the invention a specially flexibilized product with an extensibility of up to 200% is obtained, are partial esters of epoxidized polysulfides of formula II. The quantitative proportion of epoxidized compounds and flexible curing agents is adjusted so that equivalent quantities of amine hydrogen to epoxy groups and possibly unsaturated ester groups are present.

In the following examples, there are described several preferred embodiments to illustrate the invention. However, it should be understood that the invention is not intended to be limited to the specific embodiments.

EXAMPLE 1

To 1393 g of an epoxy resin based on bisphenol A with an epoxy equivalent of 188 g and a viscosity of 10 000 mPa's at 25° C. and 2 g of benzyldimethyl amine, 1,000 g of a terminal mercapto polysulfide polymer with an average molecular weight of 1,000 and a bis-ethylformal disulfide chain (Thiokol ® LP-3) were added dropwise with stirring under an inert gas atmosphere at 60° to 80° C. over a period of 2 hours. The mixture was allowed to stand for an additional 3 hours at 80° C. and the product was a clear liquid with an epoxy number of 10.6 and a viscosity of approximately 83 000 mPa's at 25° C. The yield was 100%.

EXAMPLE 2

Using the procedure of Example 1, 676 g of Rütapox ® 0161 were reacted with 0.5 g of BDMA and 1,000 g of Thiokol ® LP-3 in 560 g of xylene and the product (100% yield) had an epoxy content of 4.0% and a viscosity (25° C.) of 1 100 mPa's.

EXAMPLE 3

Using the procedure of Example 1, 478 g of Rütapox ® thinner R were reacted with 0.5 g of BDMA and 1,000 g of Thiokol ® LP-3 and the product (100% yield) had an epoxy content of 6.5% and a viscosity (25° C.) of 55 000 mPa's.

EXAMPLE 4

Using the procedure of Example 1, 688 g of Rütapox ® 0161 were reacted with 0.5 g of BDMA and 1,000 g of Thiokol ® LP-3 in 1,688 g of propylene glycol monoethyl ether (PM) and the product (100% yield) had an epoxy content of 2.8% and a viscosity (25° C.) if 1 700 mPa's.

EXAMPLE 5

Using the procedure of Example 1, 478 g of Rütapox ® thinner R were reacted with 0.5 g of BDMA and 1,000 g of Thiokol ® LP-3 in 1,478 g of propylene glycol monoethyl ether (PM) and the product (100% yield) had an epoxy content of 2.8% and a viscosity (25° C.) of 75 mPa's.

EXAMPLE 6

Into a 2 liter three-necked flask equipped with a thermometer, a wing stirrer, a reflux condenser and a dropping funnel, 406 g of epoxidized polysulfide oligomer (Example 1) were placed and heated to 80° C. In the presence of 1.5 g of benzyldimethylamine, 73.44 g of acrylic acid were added dropwise at 80° C. over a period of 1 to 2 hours. After allowing the mixture to stand for 18 to 20 hours at 80° C., the mixture was diluted with 200 g of benzyl alcohol and cooling took place. The ester resin had a solid content of 70%, a viscosity of 700 mPa's (Hoppler viscosimeter, at 25° C.) and an acid number of 3.6 mg KOH/g.

EXAMPLE 7

In a heatable 2 liter three-necked flask equipped with a thermometer, a wing stirrer, a reflux condenser and a dropping funnel, 1,075 g of epoxidized polysulfide of Example 2, 1.5 g of benzyl dimethyl amine and 12.5 g of xylene were heated to 80° C., and 36.7 of acrylic acid were added dropwise over a period of 2 hours. The mixture stood at 80° C. over a period of 18 hours (acid number 3.7 mg KOH/g). The vinyl ester (clear liquid, 100% yield) had a viscosity (25° C.) of 2 000 mPa's and a residual epoxy content of 2.05%.

EXAMPLE 8

Using the procedure of Example 7, 1,075 g of epoxidized polysulfide of Example 2, 1.5 g of benzyl dimethyl amine and 87.7 g of methacrylic acid and 29 g of xylene were reacted and the mixture stood at 80° C. for a period of 20 hours. The vinyl ester had a viscosity (25° C.) of 3500 mPa's and an acid number of 4.5 mg KOH/g.

EXAMPLE 9

Using the procedure of Example 7, 1,075 g of epoxidized polysulfide of Example 2, 1 g of benzyl dimethyl amine and 43.9 g of methacrylic acid and 15 g of xylene were reacted. The mixture stood at 80° C. for a period of 18 hours. The vinyl ester had a viscosity (25° C.) of 2 100 mPa's and a residual epoxy content of 1.97%.

EXAMPLE 10

Using the procedure of Example 7, 662.5 g of epoxidized polysulfide of Example 3, 1.5 g of benzyl dimethyl ammonium chloride, 73.44 g of acrylic acid and 246.4 g of xylene were reacted and the mixture stood at 80° C. for a period of 18 hours. The vinyl ester had a viscosity (25° C.) of 3 500 mPa's and an acid number of 4.3 mg KOH/g.

EXAMPLE 11

Using the procedure of Example 7, 662.5 g of epoxidized polysulfide of Example 3, 1 g of benzyl dimethylamine, 36.7 g of acrylic acid and 233.7 g of xylene were reacted and the mixture stood at 80° C. for a period of 18 hours. The vinyl ester had a viscosity (25° C.) of 1 100 mPa's and a residual epoxy content of 1.86%.

EXAMPLE 12

Using the procedure of Example 6, 556 g of a commercially available glycidylether of a terminal mercapto polysulfide polymer (ELP®-3) with an epoxy number of 3.35 and a viscosity at 25° C. of 4 000 mPa's were reacted with 73.4 g of acrylic acid and the ester had at 25° C. a viscosity of 2 800 mPa's.

EXAMPLE 13

To 480 g of 2,4,4-trimethyl hexamethylene diamine (TMD), 822 g of the flexibilized ester of Example 6 were added dropwise at 60° to 80° C. with stirring in the presence of air over a period of 2.5 hours. The mixture stood for. 0.5 hours at 80° C. and the curing agent had a viscosity of 3 700 mPa's at 25° C. The yield was 100%.

EXAMPLE 14

Using the procedure of Example 13, 256 g of N-amino-ethyl piperazine were reacted with 631 g of the ester of Example 12 and the curing agent had at 25° C. a viscosity of 5 200 mPa's.

EXAMPLE 15

Using the procedure of Example 13, 186 g of 2-butyl-2-ethylpentane-1,5-diamine were reacted with 631 g of the ester of Example 12 to obtain the curing agent with a viscosity of 3 400 mPa's at 25° C.

EXAMPLE 16

Using the procedure of Example 13, 182 g of triethylene glycoldiamine were reacted with 631 g of the ester of Example 12 to obtain the curing agent with a viscosity of 3 100 mPa's at 25° C.

EXAMPLE 17

Using the procedure of Example 13, 316 g of TMD were reacted with 3,400 g of epoxidized polysulfide of Example 4 to obtain an amine curing agent with a viscosity (25° C.) of 6 200 mPa's and an amine equivalent of 637 g/equiv.

EXAMPLE 18

Using the procedure of Example 13, 206.4 g of diethlylene triamine (DETA) were reacted with 3,072 g of epoxidized polysulfide of Example 5 to obtain an amine curing agent with a viscosity (25° C.) of 820 mPa's and an amine equivalent of 420 g/equiv.

EXAMPLE 19

Using the procedure of Example 13, 129.2 g of N-ethylamino piperazine were reacted with 1,075 g of the ester of Example 7 and 717.2 g of propylene glycolmonomethyl ether to obtain an amine curing agent with a viscosity (25° C.) of 2 830 mPa's and an amine equivalent of 959 g/equiv.

EXAMPLE 20

Using the procedure of Example 13, 136 g of m-xylilene diamine were reacted with 1,066.8 g of acrylate of Example 8 and 711.2 g of propylene glycolmonomethyl ether to obtain an amine curing agent with a viscosity (25° C.) of 510 mPa's and an amine equivalent of 638 g/equiv.

EXAMPLE 21

Using the procedure of Example 13, 102 g of diaminopentane were reacted with 1,102.2 g of the ester of Example 9 and 734.8 g of propylene glycol monomethyl ether to obtain an amine curing agent with a viscosity (25° C.) of 730 mPa's and an amine equivalent of 646 g/equiv.

EXAMPLE 22

Using a procedure of Example 13, 158 g 2,4,4-trimethylhexamethylene diamine (TMD) were reacted with 909 g of the ester of Example 10 and 606 g propylene glycolmonomethyl ether to obtain an amine curing agent with a viscosity (25° C.) of 1,000 mPa's and an amine equivalent of 567 g/equiv.

EXAMPLE 23

Using the procedure of Example 13, 158 g TMD were reacted with 1,021.8 g of the ester of Example 11 and 606 g propylene glycolmonomethyl ether to obtain an amine curing agent with a viscosity (25° C.) of 1,125 mPa's and an amine equivalent of 631 g/equiv.

EXAMPLES 24 to 27

In each Example 100 g of epoxy compounds were mixed homogeneously with curing agent. After a curing time of 7 days at 23° C. the ultimate tensile strength and the maximum elongation are estimated. The measurments were made with sheets of 4 mm thickness according to the specification DIN 53 455. Parallel tests against chemicals were made according to DIN 53 168 with these sheets. In those tests good resistance to solutions of sodium hydroxide and sulfuric acid were found. The results are in the following table:

| No. | Resin | Curing agent acc. Ex. | Ultimate tensile strength [mPa] | Elong. [%] | NaOH 20% 7d | 14d | H$_2$SO$_4$ 20% 7d | 14d | Diesel 7d | 14d |
|---|---|---|---|---|---|---|---|---|---|---|
| 24 | resin fr. Ex. 1 | 100 g  4 20 g | 4.1 | 87.4 | 1 | 1 | 1 | 1 | 1 | 1 |
| 25 | 0166 thin.S | 80 g  5 70 g 20 g | 30.1 | 22.7 | 1 | 1 | 1 | 1 | 1 | 1 |
| 26 | ELP$^R$-3 0161 | 35 g  6 50 g 65 g | 26.5 | 27.4 | 1 | 1 | 1 | 1 | 1 | 1 |

-continued

| No. | Resin | Curing agent acc. Ex. | Ultimate tensile strength [mPa] | Elong. [%] | NaOH 20% 7d | 14d | H$_2$SO$_4$ 20% 7d | 14d | Diesel 7d | 14d |
|---|---|---|---|---|---|---|---|---|---|---|
| 27 | 0166 | 80 g  7  60 g | 15.9 | 35.9 | 1 | 1 | 1 | 1 | 1 | 1 |

Explanations:
1 = unrestricted
The identifications indicate
0166 = (Rutapox$^R$ 0166) Epoxy resin based on bisphenol A / bisphenol F; viscosity (25° C.); 8 000 mPa · s
0161 = Rutapox$^R$ 0161) epoxy resin based on bisphenol F; viscosity (25° C.); 4 500 mPa · s.
Thinner S = Rutapox$^R$ Thinner S) hexane diglycidyl ether
ELP$^R$-3 = epoxidized polysulfide polymer (Example 2)
Rutapox$^R$ Thinner R = Resorcine diglycidyl ether (epoxy equivalent 121)
BDMA = benzyldimethyl amine
TMD = 2,4,4-trimethylhexamethylene diamine
DETA = diethylene triamine Various modifications of the products and method of the invention may be made without departing from the spirit or scope thereof and it is be understood that the invention is intended to be limited only as defined in the appended claims.

What we claim is:

1. An epoxy resin composition containing as curing agent an addition product of A) at least one member of the group consisting of primary amines and secondary amines having at least two secondary amino groups and B) at least one ester having a formula $$CH=C-(CH_2)_m-\overset{O}{\underset{\|}{C}}-O-CH_2-R_3-CH_2-S-(R_4-S-S)_n-R_4-S-R_5-CH-CH_2 \atop R_1 \; R_2 \qquad\qquad\qquad\qquad\qquad\qquad\qquad\qquad\qquad\qquad\qquad\qquad \diagdown O \diagup$$

II wherein m is 0 or 1, n is an integer from 3 to 25, R$_1$ is selected from the group consisting of furyl, phenyl and hydrogen, R$_2$ is hydrogen or methyl R$_3$ is $$-CHOH- \text{ or } -CH-CH-R_6-CH_2-CH-, \atop \qquad\qquad\quad\; OH \qquad\qquad\quad\;\; OH$$

R$_4$ is $-C_2H_4-O-CH_2-O-C_2H_4-$,

R$_5$ $$-CH_2-\underset{OH}{\underset{|}{CH}}-CH_2-R_6-CH_2-,$$

R$_6$ is

—O—⟨phenyl⟩—R$_7$—⟨phenyl⟩—O—

R$_7$ is selected from the group consisting of methylene and $$-\underset{CH_3}{\overset{CH_3}{\underset{|}{\overset{|}{C}}}}-.$$

wherein amine A) is reacted with ester B) in a ratio of one amine hydrogen atom for each ethylenically unsaturated bond of the ester such that the addition product contains further amine hydrogen atoms.

2. An epoxy based adhesive and sealing composition containing an epoxy resin composition of claim 1.

3. A coating composition based on an epoxy resin containing at least one addition product of claim 1.

* * * * *